US012339556B2

United States Patent
Cha et al.

(10) Patent No.: US 12,339,556 B2
(45) Date of Patent: Jun. 24, 2025

(54) COLOR-CHANGING POLYMER COMPOSITION, ION-CONDUCTIVE COMPOSITION, TRANSPARENT ELECTRODE LAYER COMPOSITION, AND ELECTROCHROMIC DEVICE COMPRISING SAME

(71) Applicants: Hyundai Motor Company, Seoul (KR); Kia Corporation, Seoul (KR); Pusan National University Industry-University Cooperation Foundation, Busan (KR)

(72) Inventors: Dong Eun Cha, Gyeonggi-do (KR); Jong Seung Park, Busan (KR); Jun Hong Choi, Busan (KR)

(73) Assignees: Hyundai Motor Company, Seoul (KR); Kia Corporation, Seoul (KR); Pusan National University Industry-University Cooperation Foundation, Busan (KR)

( * ) Notice: Subject to any disclaimer, the term of this patent is extended or adjusted under 35 U.S.C. 154(b) by 805 days.

(21) Appl. No.: 17/462,893

(22) Filed: Aug. 31, 2021

(65) Prior Publication Data

US 2022/0206352 A1 Jun. 30, 2022

(30) Foreign Application Priority Data

Dec. 30, 2020 (KR) .................... 10-2020-0187011

(51) Int. Cl.
*G02F 1/155* (2006.01)
*C08L 27/16* (2006.01)
(Continued)

(52) U.S. Cl.
CPC .............. *G02F 1/155* (2013.01); *C08L 27/16* (2013.01); *C08L 29/04* (2013.01); *C08L 33/12* (2013.01);
(Continued)

(58) Field of Classification Search
CPC ...... G02F 1/155; G02F 1/15165; C08L 27/16; C08L 29/04; C08L 33/12; C08L 2203/20; C08L 2205/03
(Continued)

(56) References Cited

U.S. PATENT DOCUMENTS

2017/0357136 A1\* 12/2017 Kloeppner ............ G02F 1/1533
2018/0346421 A1 12/2018 Lin et al.

FOREIGN PATENT DOCUMENTS

| KR | 10-2014-0027671 A | | 3/2014 |
|---|---|---|---|
| KR | 20160007366 A | \* | 1/2016 |
| KR | 2019-0057436 A | | 5/2019 |

OTHER PUBLICATIONS

Office Action issued Oct. 4, 2024 in corresponding German patent application No. 102021209635.2.

\* cited by examiner

*Primary Examiner* — Ling Siu Choi
*Assistant Examiner* — Ronald Grinsted
(74) *Attorney, Agent, or Firm* — Fox Rothschild LLP

(57) ABSTRACT

Disclosed are a color-changing polymer composition, an ion-conductive composition, and a transparent electrode layer composition for a painting-type spray coating process, and an electrochromic device including the same. The color-changing polymer composition for an electrochromic device includes an amount of about 5 to 30 wt % of a color-changing material, an amount of about 0.01 to 1 wt % of ferrocene, an amount of about 10 to 30 wt % of a polymer matrix, an amount of about 0 to 70 wt % of an ion-
(Continued)

conductive material, and an amount of about 1 to 10 wt % of a POSS (polyhedral oligomeric silsesquioxane) derivative, based on the total weight of the composition.

10 Claims, 1 Drawing Sheet

(51) Int. Cl.
*C08L 29/04* (2006.01)
*C08L 33/12* (2006.01)
*G02F 1/1516* (2019.01)

(52) U.S. Cl.
CPC ...... *G02F 1/15165* (2019.01); *C08L 2203/20* (2013.01); *C08L 2205/03* (2013.01)

(58) Field of Classification Search
USPC .......................................................... 524/401
See application file for complete search history.

US 12,339,556 B2

COLOR-CHANGING POLYMER COMPOSITION, ION-CONDUCTIVE COMPOSITION, TRANSPARENT ELECTRODE LAYER COMPOSITION, AND ELECTROCHROMIC DEVICE COMPRISING SAME

CROSS REFERENCE TO RELATED APPLICATION

The present application claims priority to Korean Patent Application No. 10-2020-0187011, filed Dec. 30, 2020, the entire content of which is incorporated herein for all purposes by this reference.

TECHNICAL FIELD

The present invention relates to a color-changing polymer composition, an ion-conductive composition, a transparent electrode layer composition, and an electrochromic device including the same. The color-changing polymer composition, the ion-conductive composition, and the transparent electrode layer composition may be applied to painting-type spray-coating process.

BACKGROUND

Recently, the importance of color in marketing has increased in various fields such as home appliances, mobile devices, and the like. In particular, in the automobile industry, the need to use color for marketing purposes is required for the luxury and differentiation of color. Accordingly, attempts are being made to provide novel colors using electrochromism. Electrochromism is a phenomenon by which a reversible color change occurs when an oxidation or reduction reaction is electrochemically caused in an electrode material. For example, when $Li^+$ or $H^+$ and electrons are injected into $WO_3$, which is a typical reduction coloring material, a color is formed due to electrochromism, and transparency is restored upon release thereof, whereas, for an oxidation coloring material such as MnO, LiO, and the like, a color is formed upon release of $Li^+$ or $H^+$ and electrons and transparency is restored upon injection thereof.

A general electrochromic device is provided in the form of a laminated structure of a substrate/an electrically conductive layer/an ion electrolyte and color-changing material layer/an electrically conductive layer/a substrate.

However, the conventional electrochromic device is limited in that it must be formed on a smooth and flat substrate such as glass or a film due to the limitations of the material forming each layer and the method of formation thereof making it difficult to use various substrate materials. Additionally, when applied to a substrate material having a distorted surface, it is impossible to manufacture and form a material thereon.

Details set forth as the background art are provided for the purpose of better understanding the background of the invention, and are not to be taken as an admission that the described details correspond to the conventional technology already known to those skilled in the art.

SUMMARY OF THE INVENTION

In preferred aspects, provided is a color-changing polymer composition, an ion-conductive composition, and a transparent electrode layer composition for a painting-type spray-coating process, and an electrochromic device including the same.

In an aspect, provided is a color-changing polymer composition for an electrochromic device. The color-changing polymer composition may include: an amount of about 5 to 30 wt % of a color-changing material; an amount of about 0.01 to 1 wt % of ferrocene; an amount of about 10 to 30 wt % of a polymer matrix; an amount of about 20 to 70 wt % of an ion-conductive material; and an amount of about 1 to 10 wt % of a POSS (polyhedral oligomeric silsesquioxane) derivative, wt % based on the total weight of the composition.

The color-changing material may suitably include octahexylviologen polyhedral oligomeric silsesquioxane (OHV-POSS) containing one to eight monohexyl-viologens on the reactive functional group of POSS (polyhedral oligomeric silsesquioxane).

The ferrocene may suitably include ferrocene substituted with an alkyl group.

The polymer matrix may suitably include one or more selected from polyvinylidene fluoride (PVDF) and derivatives thereof, polymethylmethacrylate (PMMA) and derivatives thereof, and polyvinyl alcohol (PVA).

The ion-conductive material may include one or more of a room-temperature ionic liquid and a lithium salt The POSS (polyhedral oligomeric silsesquioxane) derivative may include one or more groups selected from alkyl, vinyl, and glycidyl.

The color-changing polymer composition may further include a solvent component, and the solvent component may include one or more selected from isopropyl alcohol (IPA), ethanol, methanol, acetone, toluene, methyl ethyl ketone (MEK), ethyl acetate, methyl isobutyl ketone (MIBK), dimethylformamide (DMF), and dimethyl sulfoxide (DMSO).

In an aspect, provided is an ion-conductive composition for an electrochromic device. The ion-conductive composition may include: an amount of 20 to 40 wt % of a polymer matrix; an amount of 20 to 40 wt % of a reactive POSS (polyhedral oligomeric silsesquioxane) material; and an amount of 20 to 40 wt % of a lithium salt, wt % based on the total weight of the composition.

The polymer matrix may suitably include one or more selected from polyvinylidene fluoride (PVDF) and derivatives thereof, polymethylmethacrylate (PMMA) and derivatives thereof, and polyvinyl alcohol (PVA).

The reactive POSS material may suitably include one or more selected from glycidyl POSS, acrylic POSS, octaphenyl POSS, isocyanate POSS, and alkyl POSS.

The ion-conductive composition may further include an amount of 20 wt % or less of a room-temperature ionic liquid. Further, the ion-conductive composition may include a solvent component, and the solvent component may suitably include one or more selected from among isopropyl alcohol (IPA), ethanol, methanol, acetone, toluene, methyl ethyl ketone (MEK), ethyl acetate, methyl isobutyl ketone (MIBK), dimethylformamide (DMF), and dimethyl sulfoxide (DMSO).

In an aspect, provided is a transparent electrode layer composition for an electrochromic device. The transparent electrode layer composition may include: an amount of about 30 to 80 wt % of a silver nanowire suspension; an amount of about 10 to 60 wt % of a poly(3,4-ethylenedioxythiophene)-poly(styrenesulfonate) (PEDOT:PSS) suspension; an amount of about 0.001 to 10 wt % of glycerol; an amount of about 0.001 to 10 wt % of ethylene glycol; an amount of about 0.001 to 10 wt % of dodecylbenzenesulfonic acid; an amount of about 0.001 to 10 wt % of divinyl sulfone; and an amount of about 0.001 to 10 wt % of dimethyl sulfoxide. The silver nanowire suspension may include an amount of about 1% of silver nanowire and the PEDOT:PSS suspension may include an amount of about 1 to 2% poly(3,4-ethylenedioxythiophene)-poly(styrenesulfonare).

The term "silver nanowire (1%) suspension" refers to the silver nanowire suspension including the amount of about 1 wt % of silver nanowire, and the term "PEDOT:PSS (1-2%) suspension" refers to the PEDOT:PSS suspension including an amount of about 1 to 2 wt % poly(3,4-ethylenedioxythiophene)-poly(styrenesulfonate).

The transparent electrode layer composition may further include a solvent component, and the solvent component may suitably include one or more selected from among isopropyl alcohol (IPA), ethanol, methanol, acetone, toluene, methyl ethyl ketone (MEK), ethyl acetate, methyl isobutyl ketone (MIBK), dimethylformamide (DMF), and dimethyl sulfoxide (DMSO).

In an aspect, provided is an electrochromic device. The electrochromic device may include: a color-changing layer formed of a color-changing polymer composition including an amount of about 5 to 30 wt % of a color-changing material, an amount of about 0.01 to 1 wt % of ferrocene, an amount of about 10 to 30 wt % of a polymer matrix, an amount of about 0 to 70 wt % of an ion-conductive material and an amount of about 1 to 10 wt % of a POSS (polyhedral oligomeric silsesquioxane) derivative, based on the total weight of the color-changing polymer composition; and a first electrode layer and a second electrode layer formed on respective surfaces of the color-changing layer.

Each of the first electrode layer and the second electrode layer may be formed of a transparent electrode layer composition including an amount of about 30 to 80 wt % of a silver nanowire (1%) suspension, an amount of about 10 to 60 wt % of a PEDOT:PSS (1-2%) suspension, an amount of about 0.001 to 10 wt % of glycerol, an amount of about 0.001 to 10 wt % of ethylene glycol, an amount of about 0.001 to 10 wt % of dodecylbenzenesulfonic acid, an amount of about 0.001 to 10 wt % of divinyl sulfone, and an amount of about 0.001 to 10 wt % of dimethyl sulfoxide, based on the total weight of the color-changing polymer composition .

The electrochromic device may further include an ion-conductive layer formed between the color-changing layer and the first electrode layer.

The ion-conductive layer maybe formed of an ion-conductive composition including an amount of about 0 to 40 wt % of a polymer matrix, an amount of about 20 to 40 wt % of a reactive POSS (polyhedral oligomeric silsesquioxane) material, an amount of about 20 to 40 wt % of a lithium salt, and an amount of about 0 to 20 wt % (excluding 0 wt %) of a mom-temperature ionic liquid, based on the total weight of the ion-conductive composition.

The electrochromic device may further include a clear coating layer formed on the surface of the first electrode layer.

The clear coating layer may suitably include one or more selected from among polycarbonate, polystyrene, polyethylene, and polyester.

The electrochromic device may further include a silver grid layer formed between the first electrode layer and the clear coating layer.

According to various exemplary embodiments of the present invention, by developing respective compositions capable of being used for painting in a spray-coating process in order to form a color-changing layer, an ion-conductive layer, and an electrode layer constituting an electrochromic device, effects of manufacturing an electrochromic device having various structures can be expected.

Other aspects of the invention are disclosed infra.

DESCRIPTION OF SPECIFIC EMBODIMENTS

Figure 1:
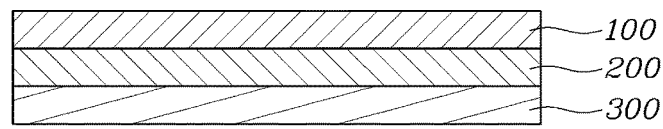
FIG. 1 shows an exemplary electrochromic device according to an exemplary embodiment of the present invention.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the whence or addition of one or more other features, integers, steps, operations, elements, components, and/or groups thereof As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about"

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Hereinafter, a detailed description will be given of embodiments of the present invention with reference to the appended drawings. However, the present invention is not limited to the following embodiments, and may be changed to have a variety of different forms. These embodiments are provided to complete the disclosure of the present invention and to fully describe the present invention to those skilled in the art.

As used herein, a term "color-changing polymer composition" refers to a composition used for the formation of a color-changing layer of an electrochromic device. The color-changing polymer composition may further include a solvent component to form a color-changing layer using a spray-coating process. In particular, the color-changing polymer composition may change its color in response to the voltage and current applied thereto.

The color-changing polymer composition may include an amount of 5 to 30 wt % of a color-changing material, an amount of 0.01 to 1 wt % of ferrocene, an amount of 10 to 30 wt % of a polymer matrix, an amount of 20 to 70 wt % of an ion-conductive material, and an amount of 1 to 10 wt % of a POSS (polyhedral oligomeric silsesquioxane) derivative, based on the total weight of the composition.

The color-changing polymer composition composed of the components in the amounts described above may further include or be mixed with a solvent component and so as to be used for painting for the purpose of spray coating.

The color-changing polymer composition including the solvent component may include an amount of 0.1 to 10 wt % of the color-changing material, an amount of 0.01 to 1 wt % of ferrocene, an amount of 0.1 to 10 wt % of the polymer matrix, an amount of 0.1 to 10 wt % of the ion-conductive material, an amount of 0.1 to 5 wt % of the POSS (polyhedral oligomeric silsesquioxane) derivative, and the remainder of the solvent, which can be used for painting.

Preferably, the color-changing polymer composition including the solvent component may include an amount of 0.1 to 2.0 wt % of the color-changing material, an amount of 0.01 to 0.05 wt % of ferrocene, an amount of 1.0 to 3.0 wt % of the polymer matrix, an amount of 4 to 10 of the ion-conductive material, an amount of 0.3 to 0.7 wt % of the POSS (polyhedral oligomeric silsesquioxane) derivative, and an amount of 80 to 92 wt % of the solvent. Based on the total weight of the composition The color-changing material may suitably include octahexylviologen polyhedral oligomeric silsesquioxane (OHV-POSS) which contains 1 to 8 monohexyl-viologens substituted on the reactive functional group of POSS (polyhedral oligomeric silsesquioxane). In particular, by altering the chemical structure of the color-changing material, various colors such as blue, green, and red may be realized. When the amount of the color-changing material is less than the above lower limit, the apparent color change may be deteriorated, whereas when the amount thereof is greater than the above upper limit, the solution may be saturated and agglomeration may occur, resulting in decreased solubility.

Ferrocene as used herein is an oxidative aid Preferably, the ferrocene may include ferrocene substituted with an alkyl group. When the amount of ferrocene is less than the above lower limit, the oxidation-reduction reaction may not be balanced and thus the stability of the color change may deteriorate, whereas when the amount of ferrocene is greater than the above upper limit, neutral transmittance may decrease due to the intrinsic yellow color thereof.

The polymer matrix may suitably include one or more selected from polyvinylidene fluoride (PVDF) and derivatives thereof polymethylmethacrylate (PMMA) and derivatives thereof, and polyvinyl alcohol (PVA). When the amount of the polymer matrix is less than the above lower limit, film formation may be insufficient, whereas when the amount of the polymer matrix is greater than the upper limit, the activity of the color-changing layer may decrease, resulting in deteriorated color-changing performance.

The ion-conductive material may suitably include one or more of a room-temperature ionic liquid and a lithium salt. When the amount of the ion-conductive material is less than the above lower limit, the ion conductivity is low, so a color change does not occur, whereas when the amount of the ion-conductive material is greater than the above upper limit, the mechanical properties of the color-changing layer may be deteriorated.

The POSS derivative as used herein may improve the mechanical strength and conductivity of the color-changing layer, and may include one or more substituted groups selected from alkyl, vinyl and glycidyl groups. When the amount of the POSS derivative is less than the above lower limit, curing may decrease, whereas when the amount thereof is greater than the above upper limit, the time taken to change color may be prolonged due to a decrease in the movement of electrons and ions.

The solvent component may be included or mixed in to prepare a color-changing polymer composition for use in painting for spray coating. The solvent component may suitably include one or more selected from isopropyl alcohol (IPA), ethanol, methanol, acetone, toluene, methyl ethyl ketone (MEK), ethyl acetate, methyl isobutyl ketone (MIBK), dimethylformamide (DMF), and dimethyl sulfoxide (DMSO). When the amount of the solvent is less than the above lower limit, nozzle clogging may occur frequently upon spraying, whereas when the amount of the solvent is greater than the above upper limit, film formation and curing maybe delayed due to the dilute concentration.

The term "ion-conductive composition" as used herein refers to a composition used for the formation of an ion-conductive layer of an electrochromic device. The ion-conductive composition may further include or be mixed with a solvent component to form an ion-conductive layer using a spray-coating process.

The ion-conductive composition may suitably include an amount of about 20 to 40 wt % of a polymer matrix, an amount of about 0 to 40 wt % of a reactive POSS (polyhedral oligomeric silsesquioxane) material, and an amount of about 20 to 40 wt % of a lithium salt. The ion-conductive composition may further include an amount of about 20 wt % or less of a room-temperature ionic liquid.

The ion-conductive composition may include or be mixed with the solvent component so as to be used for painting for the purpose of spray coating. The ion-conductive layer formed by subjecting the ion-conductive composition composed of the components in the amounts described above to spray coating has high surface hardness, so damage thereto does not occur in the additional spray-coating process for the formation of an electrode layer.

The ion-conductive composition including the solvent component may suitably include an amount of about 5 to 20 wt % of the polymer matrix, an amount of about 5 to 20 wt % of the reactive POSS (polyhedral oligomeric silsesquioxane) material, an amount of about 5 to 20 wt % of the lithium salt, and the remainder of the solvent, based on the total weight of the composition. Also, the ion-conductive composition may further include an amount of about 20 wt % or less of the room-temperature ionic liquid based on the total weight of the composition.

Preferably, the ion-conductive composition including the solvent component may suitably include an amount of about 5 to 15 wt % of the polymer matrix, an amount of about 5 to 15 wt % of the reactive POSS material, an amount of about 5 to 15 wt % of the lithium salt, and an amount of about 80 to 96 wt % of the solvent.

The polymer matrix may suitably include one or more selected from polyvinylidene fluoride (PVDF) and derivatives thereof, polymethylmethacrylate (PMMA) and derivatives thereof, and polyvinyl alcohol (PVA). When the amount of the polymer matrix is less than the above lower limit, film formation may be insufficient, whereas when the amount of the polymer matrix is greater than the above upper limit, the activity of the ion-conductive layer may decrease, resulting in deteriorated color-changing performance.

The reactive POSS material may suitably include one or more selected from glycidyl POSS, acrylic POSS, octaphenyl POSS, isocyanate POSS, and alkyl POSS. When the amount of the reactive POSS material is less than the above lower limit, the extent of curing may decrease in the formation of the ion-conductive layer, whereas when the amount of the reactive POSS material is greater than the above upper limit, the time taken to change color may be prolonged due to a decrease in the movement of electrons and ions.

The lithium salt may form ions that move in the ion-conductive layer. When the amount of the lithium salt is less than the above lower limit, the ion conductivity may decrease, whereas when the amount of the lithium salt is greater than the above upper limit, the transmittance may decrease due to saturation and the apparent color change may decrease. Here, the lithium salt may suitably include two or more selected from the group consisting of $LiPF_6$, $LiBF_4$, $LiClO_4$, $LiCl$, $LiBr$, $LiI$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N(LiFSI)$, and $(CF_3SO_2)_2NLi$.

The solvent component may be included or be mixed to prepare an ion-conductive composition so as to be used in painting for spray coating. The solvent component may suitably include at least one selected from isopropyl alcohol (IPA), ethanol, methanol, acetone, toluene, methyl ethyl ketone (MEK), ethyl acetate, methyl isobutyl ketone (MIBK), dimethylformamide (DMF), and dimethyl sulfoxide (DMSO). When the amount of the solvent is less than the above lower limit, nozzle clogging may occur frequently upon spraying, whereas when the amount of the solvent is greater than the above upper limit, film formation and curing may be delayed due to the dilute concentration.

The term "transparent electrode layer composition" refers to a composition used for the formation of an electrode layer of an electrochromic device. The transparent electrode layer composition may be included or be mixed with a solvent component to form an electrode layer using a spray-coating process.

The transparent electrode layer composition may include an amount of about 30 to 80 wt % of a silver nanowire (1%) suspension, an amount of about 10 to 60 wt % of a PEDOT:PSS (1-2%) suspension, an amount of about 0.001 to 10 wt % of glycerol, an amount of about 0.001 to 10 wt % of ethylene glycol, an amount of about 0.001 to 10 wt % of dodecylbenzenesulfonic acid, an amount of about 0.001 to 10 5 wt % of divinyl sulfone, and an amount of about 0.001 to 10 wt % of dimethyl sulfoxide, based on the total weight of the composition.

Preferably, the transparent electrode layer composition may include an amount of about 30 to 50 wt % of the silver nanowire (1%) suspension, an amount of about 39 to 59 wt % of the PEDOT:PSS (1-2%) aqueous suspension, an amount of about 5 to 7.5 wt % of glycerol, an amount of about 2.5 to 3.75 to wt % of ethylene glycol, an amount of about 0.25 to 0.375 wt % of dodecylbenzenesulfonic acid, an amount of about 0.25 to 0.375 wt % of divinyl sulfone, and an amount of about 2.5 to 3.75 wt % of dimethyl sulfoxide, based on the total weight of the composition.

The transparent electrode layer composition may further include or be mixed with a solvent so as to be used for painting of spray coating. The transparent electrode layer composition including a solvent component may include an amount of about 1 to 30 wt % of the silver nanowire (1%) suspension, an amount of about 1 to 30 wt % of the PEDOT:PSS (1-2%) suspension, an amount of about 0.001 to 3 wt % of glycerol, an amount of about 0.001 to 3 wt % of ethylene glycol, an amount of about 0.001 to 3 wt % of dodecylbenzenesulfonic acid, an amount of about 0.001 to 3 wt % of divinyl sulfone, an amount of about 0.001 to 3 wt % of dimethyl sulfoxide, and the remainder of the solvent, based on the total weight of the composition.

When the amount of the silver nanowire (1%) suspension is less than the above lower limit, conductivity may be lowered, whereas when the amount thereof is greater than the above upper limit, transmittance maybe lowered.

When the amount of the PEDOT:PSS (1-2%) suspension is less than the above lower limit, conductivity may decrease and the surface roughness of the electrode layer may be deteriorated, whereas when the amount of the PEDOT:PSS (1-2%) suspension is greater than the above upper limit, a blue color may appear, and thus the apparent color change may decrease.

Glycerol and ethylene glycol are used as additives for the PEDOT:PSS (1-2%) suspension. When the amounts of glycerol and ethylene glycol fall within the above ranges, a superior effect of improving the conductivity of the PEDOT:PSS (1-2%) suspension maybe obtained. However, when the amounts thereof fall out of the above ranges, the effect of improving conductivity may be deteriorated, and the conductivity of the electrode layer may be lowered.

When the amount of dodecylbenzenesulfonic acid is less than the above lower limit, the dispersibility of the solution may be deteriorated, whereas when the amount thereof is greater than the above upper limit, agglomeration may occur due to reaction with the PEDOT:PSS (1-2%) suspension.

Divinyl sulfone may make the surface of the electrode layer hard through a crosslinking reaction with an additive. When the amount of divinyl sulfone is less than the above lower limit, curing may not occur sufficiently, whereas when the amount thereof exceeds the above upper limit, overcuring may occur.

The solvent component may be included or mixed to prepare a transparent electrode layer composition for use in painting for spray coating. The solvent component may suitably include on or more selected from among isopropyl alcohol (IPA), ethanol, methanol, acetone, toluene, methyl ethyl ketone (MEK), ethyl acetate, methyl isobutyl ketone (MIBK), dimethylformamide (DMF), and dimethyl sulfoxide (DMSO). When the amount of the solvent is less than the above lower limit, nozzle clogging may occur frequently upon spraying, whereas when the amount of the solvent is greater than the above upper limit, film formation and curing maybe delayed due to the dilute concentration.

Using the color-changing polymer composition, the ion-conductive composition, and the transparent electrode layer composition as described above, a laminated electrochromic device may be manufactured through spray coating. In particular, since a spray-coating process may be applied, an electrochromic device may be formed on various substrate materials, and the configuration such as the substrate maybe eliminated.

Figure 2:
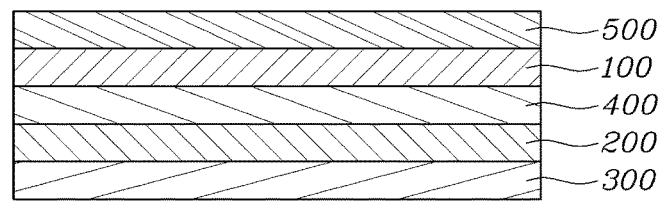
FIG. 2 shows an exemplary electrochromic device according to an exemplary embodiment of the present invention.
Figure 3:
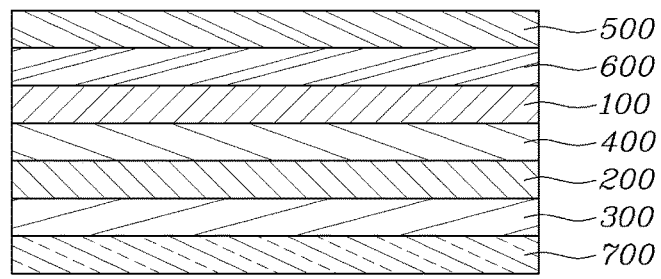
FIG. 3 shows an exemplary electrochromic device according to an exemplary embodiment of the present invention.

FIG. 1 shows an exemplary electrochromic device according to an exemplary embodiment of the present invention, FIG. 2 shows an exemplary electrochromic device according to an exemplary embodiment of the present invention, and FIG. 3 shows an exemplary electrochromic device according to an exemplary embodiment of the present invention.

As shown in FIG. 1, the electrochromic device includes a color-changing layer 200, formed of the color-changing polymer composition, and a first electrode layer 100 and a second electrode layer 300, formed of the transparent electrode layer composition, on respective surfaces of the color-changing layer 200.

In addition, as shown in FIG. 2, the electrochromic device may further include an ion-conductive layer 400 formed of the ion-conductive composition between the color-changing layer 200 and the first electrode layer 100, and a clear coating layer 500 formed on the surface of the first electrode layer 100.

In addition, as shown in FIG. 3, the electrochromic device may further include a silver grid layer 600 formed between the first electrode layer 100 and the clear coating layer 500, and a substrate 700 formed under the second electrode layer 300.

The color-changing layer 200 is a layer in which a color change actually occurs in response to the voltage and current applied thereto, and may be formed by mixing the color-changing polymer composition as described above. For example, the color-changing polymer composition may include an amount of about 5 to 30 wt % of the color-changing material, an amount of about 0.01 to 1 wt % of ferrocene, an amount of about 10 to 30 wt % of the polymer matrix, an amount of about 0 to 70 wt % of the ion-conductive material, an amount of about 1 to 10 wt % of the POSS (polyhedral oligomeric silsesquioxane) derivative, and a solvent component, followed by spray coating.

The color-changing layer 200 includes a color-changing material, which is an organic/inorganic hybrid material in which POSS, as an inorganic material, and viologen, as an organic material, are bound to each other, and is imparted with electrochromic properties by substituting 1 to 8 monohexyl-viologens as an electrochromic material on the reactive organic functional group around POSS. The octahexyl-viologen polyhedral oligomeric silsesquioxane (OHV-POSS) in the color-changing material has advantages in that a short time for color change may be required, low-voltage driving may be possible, and high color efficiency may be exhibited.

The first electrode layer 100 and the second electrode layer 300 are layers serving as electrodes for transferring oxidation and reduction potentials, and may be formed by mixing the transparent electrode layer composition as described above and by spray coating. For example, the transparent electrode layer composition may include an amount of about 30 to 80 wt % of the silver nanowire (1%) suspension, an amount of about 10 to 60 wt % of the PEDOT:PSS (1-2%) suspension, an amount of about 0.001 to 10 wt % of glycerol, an amount of about 0.001 to 10 wt % of ethylene glycol, an amount of about 0.001 to 10 wt % of dodecylbenzenesulfonic acid, an amount of about 0.001 to 10 wt % of divinyl sulfone, an amount of about 0.001 to 10 wt % of dimethyl sulfoxide, and a solvent component, based on the total weight of the transparent electrode layer composition. For example, a painting solution, obtained by mixing the transparent electrode layer composition with the solvent, may be applied through spraying, followed by low-temperature heat treatment (80° C.) to form an electrode layer having a mirror-like surface and a sheet resistance of about 3 Ω.

The first electrode layer 100 and the second electrode layer 300 are transparent electrode layers, and exhibit transmittance of 80% or greater due to the use of a composite of poly(3,4-ethylenedioxythiophene):polystyrene sulfonate (PEDOT:PSS) and silver nanowires and relatively uniform and improved electrical conductivity by filling gaps between silver nanowires, which are a metal material, with PEDOT:PSS, which is an organic conductive polymer material. Divinyl sulfone may be added as a crosslinking agent to enable the formation of an independent conductive film through reaction with PEDOT:PSS, improve stability of the film, maintain conductivity, and improve mechanical properties.

The ion-conductive layer 400 is a layer that stores ions in order to realize charge balance depending on the electron movement, and may be formed by mixing the ion-conductive composition as described above, and by spray coating. The ion-conductive composition may include an amount of about 20 to 40 wt % of the polymer matrix, an amount of about 20 to 40 wt % of the reactive POSS (polyhedral oligomeric silsesquioxane) material, an amount of about 20 to 40 wt % of the lithium salt and the solvent, based on the total weight of the ion-conductive composition.

This ion-conductive layer 400 includes a thermosetting ion-conductive layer composition using glycidyl POSS and electrolyte LiTFSI, so a painting-type spraying process may be applied, and by adding PVDF-HFP, used as the polymer matrix in the color-changing material layer, a film may be efficiently formed. Meanwhile, the polymer matrix, the reactive POSS (polyhedral oligomeric silsesquioxane) material, and the lithium salt may exhibit the greatest ion conductivity when mixed at a weight ratio of 1:1:1.

The clear coating layer 500 is located at the outermost position of the electrochromic device to protect the electrochromic device and impart repetitive variable characteristics, and includes an acrylic composition capable of photocuring or thermosetting and having high surface hardness.

For example, the clear coating layer 500 may include one or more selected from among polycarbonate, polystyrene, polyethylene, and polyester.

The silver grid layer 600 is formed to alter the time taken to change colors and patterns, and may be formed in a silver grid or line structure.

The substrate 700 is a base material that forms an electrochromic device, and various substrates may be applied. Since all of the individual layers forming the electrochromic device may be formed through spray coating, it is possible to use not only a smooth and flat gas or film substrate, but also a substrate having a somewhat rough surface, a curved surface, or a distorted structure. Accordingly, the electrochromic device is expected to be widely usable, and may be applied to technical fields such as that of flexible displays.

Moreover, individual layers forming the electrochromic device may be provided with design elements such as patterning by using a mask when performing spray coating.

Although the various exemplary embodiments of the present invention have been disclosed for illustrative purposes with reference to the appended drawings, the present invention is not limited thereto, and is defined by the accompanying claims. Therefore, those skilled in the art will appreciate that various modifications, additions and substitutions are possible, without departing from the scope and spirit of the invention as disclosed in the accompanying claims.

What is claimed is:

1. A color-changing polymer composition for an electrochromic device, comprising:
    an amount of about 5 to 30 wt % of a color-changing material;
    an amount of about 0.01 to 1 wt % of ferrocene;
    an amount of about 10 to 30 wt % of a polymer matrix;
    an amount of about 20 to 70 wt % of an ion-conductive material; and
    an amount of about 1 to 10 wt % of a polyhedral oligomeric silsesquioxane (POSS) derivative,
    all the wt % based on the total weight of the color-changing polymer composition.

2. The color-changing polymer composition of claim 1, wherein the color-changing material comprises octahexyl-viologen polyhedral oligomeric silsesquioxane (OHV-POSS) containing one to eight monohexyl-viologens on a reactive functional group of POSS (polyhedral oligomeric silsesquioxane).

3. The color-changing polymer composition of claim 1, wherein the ferrocene comprises ferrocene substituted with an alkyl group.

4. The color-changing polymer composition of claim 1, wherein the polymer matrix comprises one or more selected from polyvinylidene fluoride (PVDF) and derivatives thereof, polymethylmethacrylate (PMMA) and derivatives thereof, and polyvinyl alcohol (PVA).

5. The color-changing polymer composition of claim 1, wherein the ion-conductive material comprises one or more of a room-temperature ionic liquid and a lithium salt.

6. The color-changing polymer composition of claim 1, wherein the POSS (polyhedral oligomeric silsesquioxane) derivative comprises one or more substituted groups of alkyl, vinyl, and glycidyl.

7. The color-changing polymer composition of claim 1, wherein the color-changing polymer composition further comprises a solvent component, and the solvent comprises one or more selected from the group consisting of isopropyl alcohol (IPA), ethanol, methanol, acetone, toluene, methyl ethyl ketone (MEK), ethyl acetate, methyl isobutyl ketone (MIBK), dimethylformamide (DMF), and dimethyl sulfoxide (DMSO).

8. An ion-conductive composition for an electrochromic device, comprising:
    an amount of about 20 to 40 wt % of a polymer matrix;
    an amount of about 20 to 40 wt % of a reactive POSS (polyhedral oligomeric silsesquioxane) material;
    an amount of about 20 to 40 wt % of a lithium salt, and
    an amount of about 20 wt % or less and greater than 0 wt % of a room-temperature ionic liquid based on the total weight of the composition, and a solvent component, wherein the solvent component comprises one or more selected from isopropyl alcohol (IPA), ethanol, methanol, acetone, toluene, methyl ethyl ketone (MEK), ethyl acetate, methyl isobutyl ketone (MIBK) dimethylformamide (DMF), and dimethyl sulfoxide (DMSO).
    all the wt % based on the total weight of the ion-conductive composition.

9. The ion-conductive composition of claim 8, wherein the polymer matrix comprises one or more selected from polyvinylidene fluoride (PVDF) and derivatives thereof, polymethylmethacrylate (PMMA) and derivatives thereof, and polyvinyl alcohol (PVA).

10. The ion-conductive composition of claim 8, wherein the reactive POSS material comprises one or more selected from glycidyl POSS, acrylic POSS, octaphenyl POSS, isocyanate POSS, and alkyl POSS.

* * * * *